No. 855,171. PATENTED MAY 28, 1907.
A. GREENSPAN.
FASTENER FOR HORSE COLLARS.
APPLICATION FILED JULY 21, 1906.
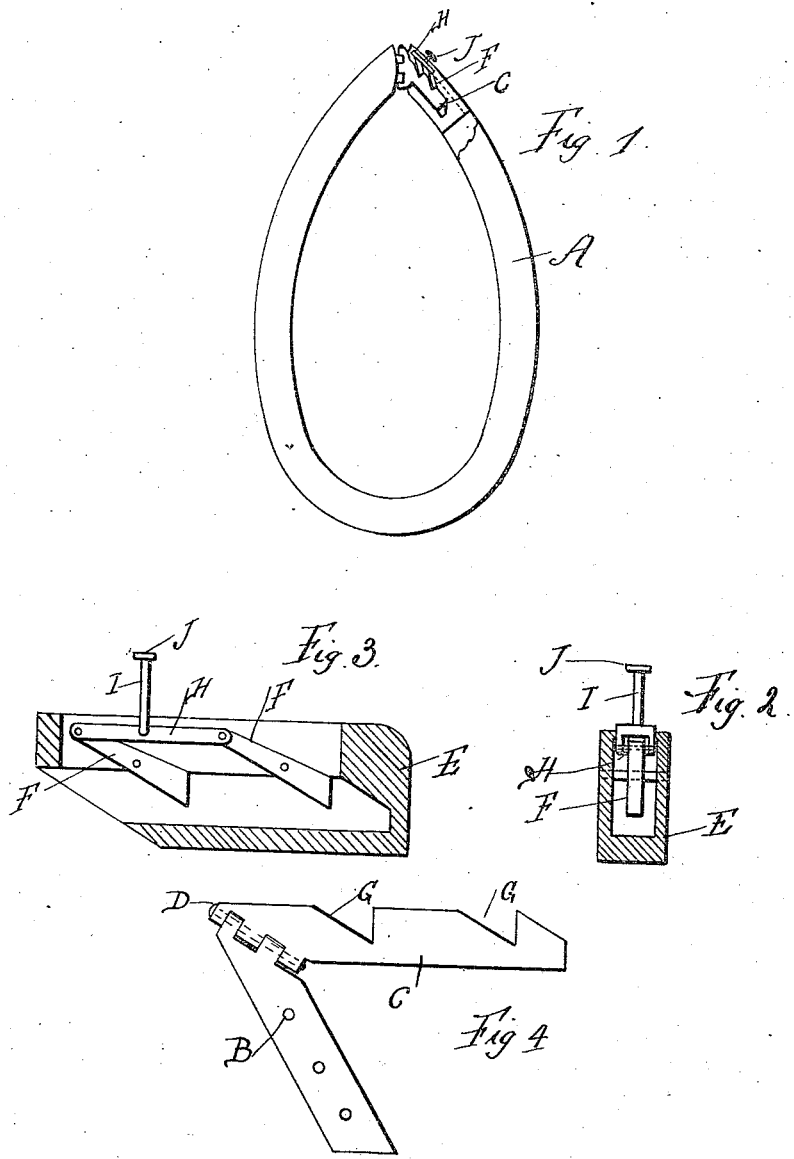
WITNESSES:
Francis A. Pocock
S. J. Williamson
INVENTOR
Abraham Greenspan
BY
W. Preston Williamson
ATTORNEY

UNITED STATES PATENT OFFICE.

ABRAHAM GREENSPAN, OF PHILADELPHIA, PENNSYLVANIA.

FASTENER FOR HORSE-COLLARS.

No. 855,171.        Specification of Letters Patent.        Patented May 28, 1907.

Application filed July 21, 1906. Serial No. 327,118.

*To all whom it may concern:*

Be it known that I, ABRAHAM GREENSPAN, a citizen of the United States, residing at Philadelphia, county of Philadelphia, and State of Pennsylvania, have invented a certain new and useful Improvement in Fasteners for Horse-Collars, of which the following is a specification.

My invention relates to a new and useful improvement in fasteners for horse collars, and has for its object to provide an exceedingly simple and effective device which may be readily applied to the collar and by which the collar may be securely fastened around the neck of the horse and yet quickly unfastened when is is desired to remove the collar without the use of straps or buckles.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by letter to the accompanying drawing forming a part of this specification, in which—

Figure 1 is an elevation of the collar, a portion thereof being broken away showing my improved fastener applied thereto. Fig. 2, an enlarged cross section of the fastener showing the arrangement of the mechanism therein. Fig. 3, a detail section of the socket showing the pawls pivoted therein, and Fig. 4, a detail elevation of the hinge latch and the shaft intended to be secured within one section of the collar.

In carrying out my invention as here embodied, A represents the collar which may be of any ordinary design adapted to fit around the horse's neck, and in one end thereof is secured the shank B by riveting or otherwise, and to this shank is hinged the latch C by the pintle D passing through the interlocking lugs formed upon the shank and latch.

E represents the socket which is secured in the opposite end of the collar and is adapted to receive the latch C, and this socket has pivoted therein the pawls F, the noses of which project downward into that portion of the socket into which the latch is adapted to pass so as to engage the notches G formed in said latch thereby locking the latter in position.

The pawls are connected together by the link H which has pivoted thereto the push rod I terminating in the button J, which in practice is intended to lie against the outer surface of the collar so that when it is desired to remove the collar it is only necessary to depress the button J thereby swinging the noses of the pawls out of engagement with the latter which will permit said latch to be withdrawn from the socket.

By the use of my improvement the disadvantage attendant upon fastening and unfastening a horse collar where buckles and straps are used is entirely obviated and much time and annoyance is saved since the collar may be instantaneously fastened or unfastened when required.

The pawls will be normally held in their locked position by the elasticity of that portion of the collar against which the button J lies so that when the button is depressed the collar will be compressed at that point, and when the button is released the springing out of that portion of the collar will force the pawls inward.

Having thus fully described my invention, what I claim as new and useful, is—

In combination with a horse collar, a shank secured in one end thereof, a latch hinged to said shank, said latch having notches formed therein, a socket secured in the opposite end of the collar adapted to receive the latch, two pawls pivoted in the socket and adapted to engage the notches in the latch, a link connecting the two pawls and a push rod pivoted to the link whereby both pawls may be actuated by the depression of the push rod, as specified.

In testimony whereof, I have hereunto affixed my signature in the presence of two subscribing witnesses.

ABRAHAM GREENSPAN.

Witnesses:
    S. M. GALLAGHER,
    E. N. SCHOFIELD.